(12) United States Patent
Mercier et al.

(10) Patent No.: US 11,046,447 B2
(45) Date of Patent: Jun. 29, 2021

(54) SYSTEMS AND METHODS FOR SUPPLYING AND DISTRIBUTING POWER

(71) Applicant: BAE Systems Information and Electronic Systems Integration Inc., Nashua, NH (US)

(72) Inventors: Michael N. Mercier, Nashua, NH (US); Michael R. Sweeney, Windham, NH (US)

(73) Assignee: BAE Systems Information and Electronic Systems Integration Inc., Nashua, NH (US)

( * ) Notice: Subject to any disclaimer, the term of this patent is extended or adjusted under 35 U.S.C. 154(b) by 176 days.

(21) Appl. No.: 16/398,563

(22) Filed: Apr. 30, 2019

(65) Prior Publication Data
US 2020/0346775 A1 Nov. 5, 2020

(51) Int. Cl.
*B64D 31/00* (2006.01)
*H02J 4/00* (2006.01)

(52) U.S. Cl.
CPC .............. *B64D 31/00* (2013.01); *H02J 4/00* (2013.01); *B64D 2221/00* (2013.01)

(58) Field of Classification Search
CPC ....... B64D 31/00; B64D 2221/00; H02J 4/00; H02J 9/06; H02J 2310/54; H02J 3/14; H02J 1/14; H02J 2310/44
USPC .................................................. 307/9.1, 10.1
See application file for complete search history.

(56) References Cited

U.S. PATENT DOCUMENTS

| 5,579,524 | A | 11/1996 | Kikinis |
| 8,570,739 | B2 | 10/2013 | Pergolesi et al. |
| 9,483,095 | B2 | 11/2016 | Tran et al. |
| 9,769,948 | B2 | 9/2017 | Welch, Jr. |
| 2009/0230771 | A1* | 9/2009 | De .................... H02M 1/36 307/44 |
| 2010/0102625 | A1* | 4/2010 | Karimi ................ B60L 50/40 307/9.1 |
| 2012/0127763 | A1 | 5/2012 | Kalaschnikow et al. |

(Continued)

FOREIGN PATENT DOCUMENTS

WO 2017216346 A1 12/2017

OTHER PUBLICATIONS

International Search Report, PCT/US20/29506, dated Aug. 6, 2020, 19 pages.

*Primary Examiner* — Toan T Vu
(74) *Attorney, Agent, or Firm* — Sand, Sebolt & Wernow LPA; Scott T Asmus (57) ABSTRACT

A modular power supply and distribution system includes a controller and at least one power distribution bus operably connected to the controller. The system includes at least one power distribution bus that distributes electrical power to a plurality of loads. The system further includes a data communication network configured to communicate data between the system and the plurality of loads, power load logic for determining a power load requirement of each of the plurality of loads, hold-up logic for determining a hold-up requirement of at least one of the plurality of loads; and power distribution logic for distributing the electrical power to the plurality of loads based, at least in part, on the determined power load requirement of each of the plurality of loads and the hold-up requirement of the at least one of the plurality of loads.

20 Claims, 3 Drawing Sheets

(56) References Cited

U.S. PATENT DOCUMENTS

| | | | | |
|---|---|---|---|---|
| 2013/0162224 A1* | 6/2013 | Eckel | ............... | H05B 45/37 |
| | | | | 323/205 |
| 2013/0297089 A1* | 11/2013 | Fu | ............... | H02J 3/14 |
| | | | | 700/295 |
| 2017/0031402 A1* | 2/2017 | Muccini | ............... | G06F 1/263 |
| 2018/0118335 A1* | 5/2018 | Gamble | ............... | B64C 27/30 |
| 2019/0349201 A1* | 11/2019 | Fuerstn Er | ............... | H04L 9/006 |

\* cited by examiner

SYSTEMS AND METHODS FOR SUPPLYING AND DISTRIBUTING POWER

TECHNICAL FIELD

The present disclosure relates to systems and methods for supplying and distributing electrical power. More particularly, the present disclosure relates to systems and methods for supplying and distributing electrical power to a plurality of loads. Specifically, the present disclosure relates to systems and methods for supplying and distributing electrical power based on power load requirements and hold-up requirements to a plurality of loads via modular outputs controlled by a system controller.

BACKGROUND

Platforms, such as vehicles, typically include various systems which require electrical power in order to operate. The platforms typically include a limited onboard electrical power source which provides electrical power to the various systems. One such exemplary vehicle having various systems which require electrical power in order to operate is an aircraft. Conventional aircraft systems typically each have their own individual power supply module. One drawback associated with each system having its own individual power supply module is that each system is typically driven to its maximum power requirement regardless of how often the system needs the required maximum amount of power. For example, if a particular aircraft system has a maximum power requirement of 300 watts of power in order to operate for a specific function, and that function is only utilized one percent of the total time of operation of the particular system, that system is always allocated 300 watts of power even though it only needs that maximum amount of power one percent of the total operational time. Further, if that particular system only needs 20 watts of power to operate the remaining ninety-nine percent of the time that particular system is still allocated 300 watts of power which could otherwise be used for other aircraft systems. As such, the over-allocation of power to various aircraft systems may waste a large amount of power which is typically undesirable.

Another drawback associated with aircraft power supply and distribution systems is that sometimes there is an interruption in the electrical power supplied to the aircraft systems. Interruptions in the electrical power supplied to aircraft systems may cause some aircraft systems to become inoperable during the power interruption which could have negative effects on, inter alia, the operation of the aircraft. Therefore, some aircraft systems are required to continue to operate during periods when the electrical power is interrupted, which is typically referred to as a hold-up requirement of the aircraft system. This is typically accomplished via a hold-up function where the individual power supply modules of the aircraft systems have sufficient storage energy which the aircraft systems utilize during the time of the power interruption. One drawback associated with the conventional hold-up functions is that each system has its own hold-up function which, among other things, adds weight and materials to the aircraft, which is undesirable.

SUMMARY

There remains a need in the art for improved systems and methods for supplying and distributing electrical power to a plurality of loads. The present disclosure addresses these and other issues.

In one aspect, the present disclosure may provide a modular power supply and distribution system for a vehicle comprising a controller; at least one power distribution bus operably connected to the controller; wherein the system receives electrical power from an electrical power source and distributes the electrical power to the at least one power distribution bus; wherein the at least one power distribution bus distributes the electrical power to a plurality of loads; a data communication network configured to communicate data between the system and the plurality of loads; the controller comprising: power load logic for determining a power load requirement of each of the plurality of loads; hold-up logic for determining a hold-up requirement of at least one of the plurality of loads; power conditioning circuitry for conditioning the electrical power; wherein the conditioned electrical power has power characteristics, based, at least in part, on the power load requirements of each of the plurality of loads and the hold-up requirement of the at least one of the plurality of loads; at least one hold-up mechanism for storing the conditioned storage electrical power; and power distribution logic for distributing the electrical power to the plurality of loads based, at least in part, on the determined power load requirement of each of the plurality of loads and the hold-up requirement of the at least one of the plurality of loads.

The power load requirement for each of the plurality of loads may be communicated from each of the plurality of loads to the system through the data communication network; and wherein the hold-up requirement of the at least one of the plurality of loads may be communicated from the at least one of the plurality of loads to the system through the data communication network. In one example, at least one of the power load requirements is different than another of the power load requirements. In one example, the hold-up requirement of at least one of the plurality of loads includes a first hold-up requirement for a first load and a second hold-up requirement for a second load; wherein the first hold-up requirement is different than the second hold-up requirement. The power load requirement may include a voltage requirement of each of the plurality of loads and a current requirement of each of the plurality of loads. The hold-up requirement may include a voltage requirement of the at least one of the plurality of loads, a current requirement of the at least one of the plurality of loads, and a time period of operation. In one example, the electrical power source may be a single power source and the system may be implemented on a system on a chip (SoC).

The system may further include a plurality of modular outputs; wherein each of the plurality of loads is connected to one of the plurality of modular outputs. In one example, the power distribution logic may cause the at least one power distribution bus to distribute the conditioned electrical power to two or more of the plurality of loads simultaneously. In another example, the power distribution logic may cause the at least one power distribution bus to distribute the conditioned electrical power to two or more of the plurality of loads at different times. The vehicle may be an aerial vehicle or a non-aerial vehicle. The system may further include an initialization module; wherein the system is initialized when the initialization module is electrically connected to the vehicle. In one example, the initialization module may be a dongle.

In another aspect, the present disclosure may provide a method comprising receiving, with a central modular supply and distribution system, electrical power from a power source on a vehicle; wherein the central modular supply and distribution system provides power to a plurality of vehicle subsystems; wherein the central modular supply and distribution system is remote from the plurality of vehicle subsystems; determining, with power load logic in the central modular supply and distribution system and not within the plurality of vehicle subsystems, a power load requirement of the plurality of vehicle subsystems; determining, with hold-up logic in the central modular supply and distribution system and not within the plurality of vehicle subsystems, a hold-up requirement of at least one of the plurality of vehicle subsystems; conditioning, with power conditioning circuitry in the central modular supply and distribution system, the electrical power based, at least in part, on the power load requirement of each of the plurality of vehicle subsystems and the hold-up requirement of the at least one of the plurality of vehicle subsystems; generating, with a controller in the central modular supply and distribution system, distribution commands to control distribution of the conditioned electrical power based on the power load requirement of each of the plurality of vehicle subsystems and the hold-up requirement of the at least one of the plurality of vehicle subsystems; and dynamically distributing, with at least one power distribution bus, the conditioned electrical power from the modular supply and distribution system to the plurality of vehicle subsystems based, at least in part, on the distribution commands.

The method may further include communicating the power load requirement of each of the plurality of vehicle subsystems to the central modular supply and distribution system via a data communication network; and communicating the hold-up requirement of the at least one of the plurality of vehicle subsystems to the central modular supply and distribution system via the data communication network.

In one example, the method may further include distributing the conditioned electrical power to two or more of the plurality of vehicle subsystems simultaneously. In another example, the method may further include distributing the conditioned electrical power to two or more of the plurality of vehicle subsystems at different times.

The method may further include storing the conditioned electrical power in at least one hold-up mechanism provided in the central modular supply and distribution system; determining, with the controller, that an electrical power interruption to the at least one of the plurality of vehicle subsystems has occurred; and dynamically distributing, with the at least one power distribution bus, the stored conditioned electrical power from the at least one hold-up mechanism to the at least one of the plurality of vehicle subsystems during the power interruption.

In another aspect, the present disclosure may provide a modular power supply and distribution system including a controller and at least one power distribution bus operably connected to the controller. The system includes at least one power distribution bus that distributes electrical power to a plurality of loads. The system further includes a data communication network configured to communicate data between the system and the plurality of loads, power load logic for determining a power load requirement of each of the plurality of loads, hold-up logic for determining a hold-up requirement of at least one of the plurality of loads; and power distribution logic for distributing the electrical power to the plurality of loads based, at least in part, on the determined power load requirement of each of the plurality of loads and the hold-up requirement of the at least one of the plurality of loads.

BRIEF DESCRIPTION OF THE SEVERAL VIEWS OF THE DRAWINGS

Sample embodiments of the present disclosure are set forth in the following description, is shown in the drawings and is particularly and distinctly pointed out and set forth in the appended claims.

Similar numbers refer to similar parts throughout the drawings.

DETAILED DESCRIPTION

Figure 1:
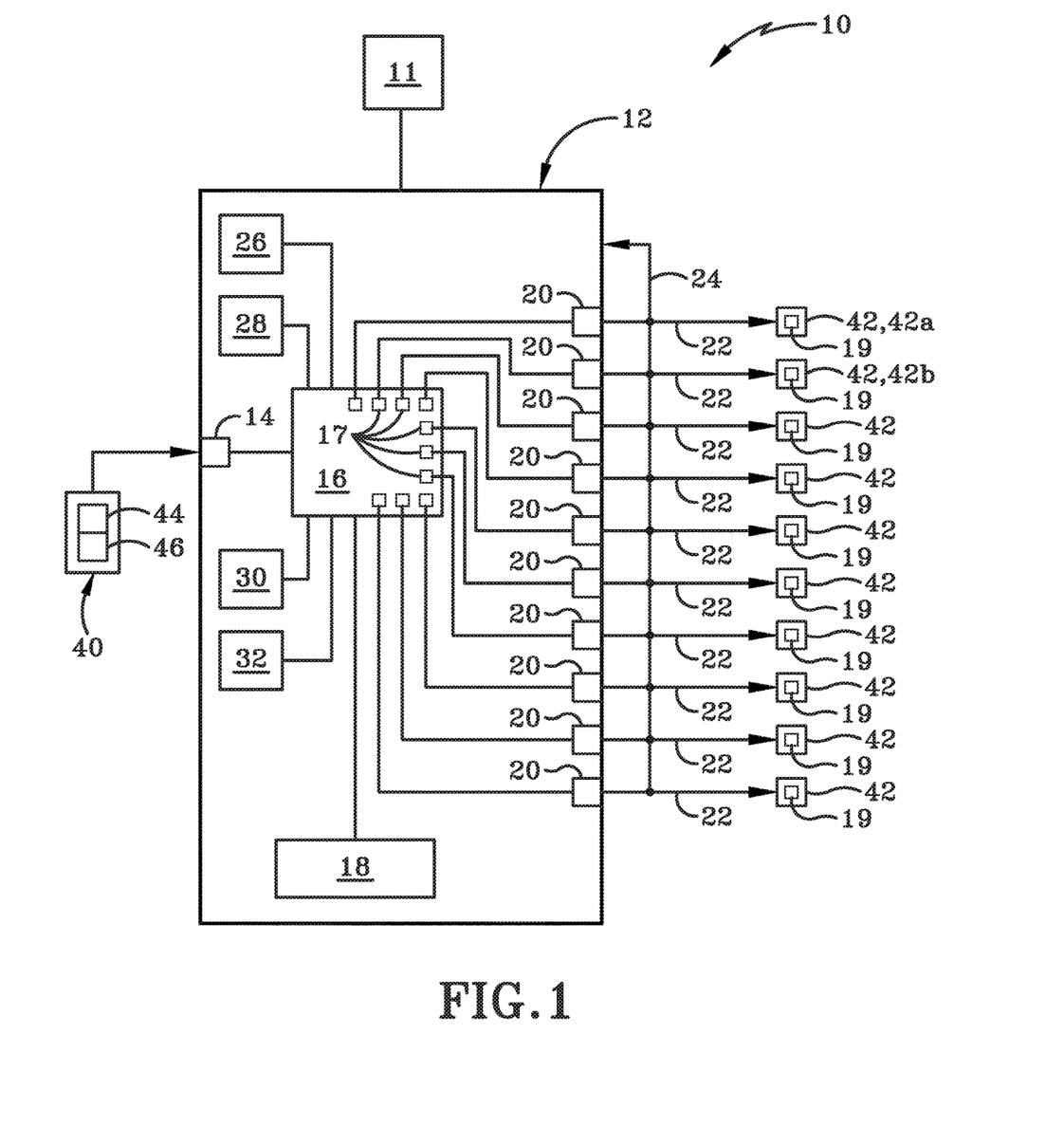
FIG. 1 is a schematic diagrammatic view of a modular power supply and distribution system in accordance with one aspect of the present disclosure.
Figure 2:
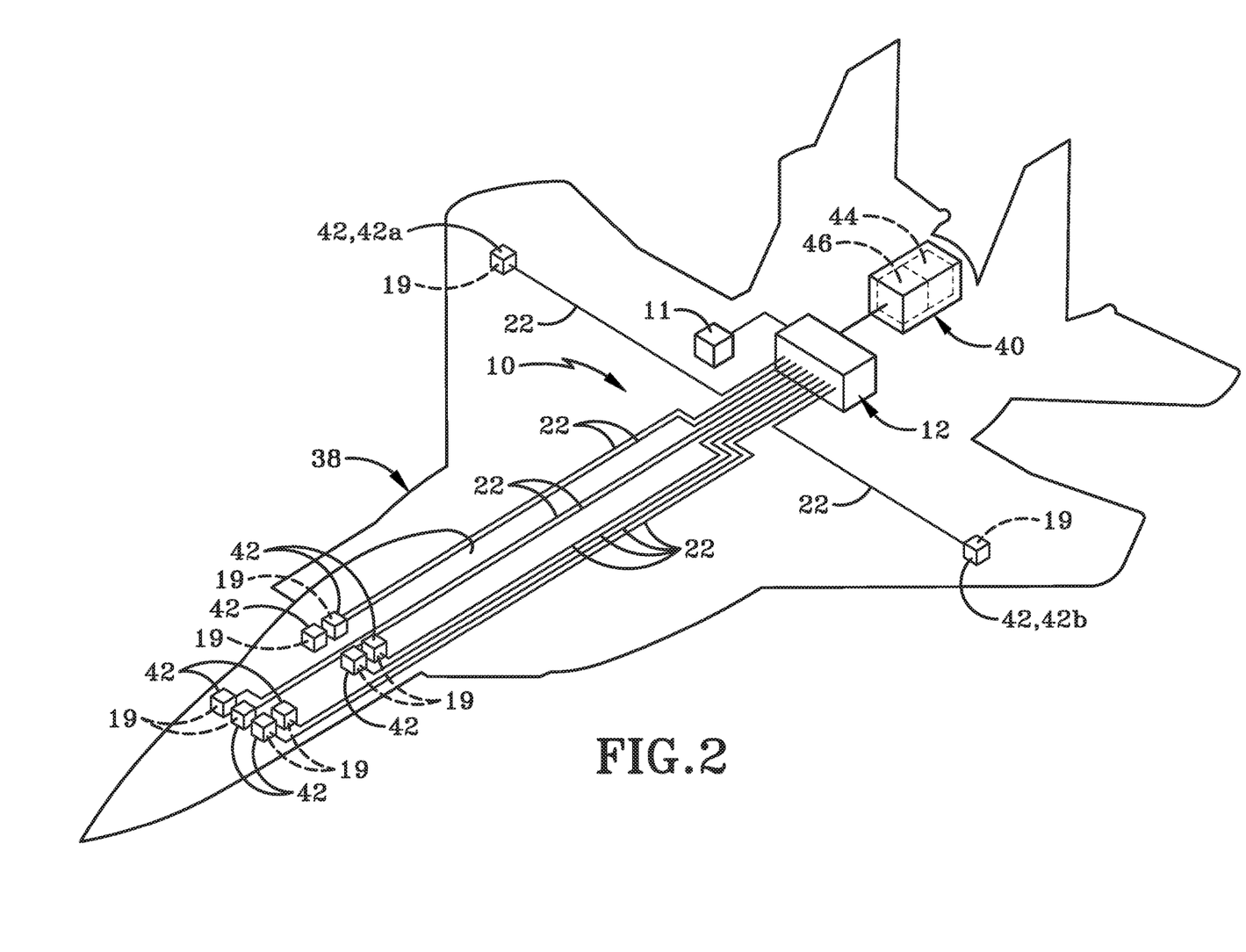
FIG. 2 is a diagrammatic view of a platform carrying the modular power supply and distribution system of the present disclosure and the modular power supply and distribution system connected to a plurality of platform systems.

As depicted throughout FIG. 1 and FIG. 2, a modular power supply and distribution system, which may also be referred to as a central modular supply and distribution system, in accordance with certain aspects of the present disclosure is shown generally at 10. The system 10 includes an initialization module 11, a controller 12, at least one modular input port 14, power conditioning circuitry 16, a plurality of switching mechanisms 17, at least one hold-up mechanism 18, a plurality of detectors 19, a plurality of modular output ports 20, at least one distribution mechanism 22, a data communication network 24, power load logic 26, hold-up logic 28, conditioning logic 30, and power distribution logic 32.

In accordance with one aspect of the present disclosure, the system 10 is carried by a platform 38 having a self-contained electrical power source 40 to distribute power to a plurality of loads 42 associated with the platform 38. Some exemplary platforms 38 having a self-contained electrical power source 40 include, but are not limited to, aerial vehicles, such as manned or unmanned aerial vehicles, land-based vehicles, sea-based vehicles, or any other platform that has a self-contained network of components that generate, distribute, utilize and store electrical energy without access to traditional electrical power grids. Further, although examples of moveable platforms 38 have been provided, it is to be entirely understood that the platform 38 may be a fixed platform. The plurality of loads 42 may be any system, subsystem, device, component, or the like that uses electrical power produced by the electrical power source 40 and supplied and distributed by the system 10.

As shown in FIG. 2, the platform 38 is an aerial vehicle, which is also denoted as 38. Although the system 10 is being described as being utilized with the aerial vehicle 38, it is to be entirely understood that the system 10 may be utilized with any suitable platform 38. The aerial vehicle 38 has a self-contained electrical power source 40 such as an alternating current (AC) generator 44 operably coupled to an engine 46 of the aerial vehicle 38 which produces electrical power. Although an exemplary electrical power source 40 has been described as being an AC generator 44 operably coupled to an engine 46, the aerial vehicle 38 may have additional electrical power sources 40, such as, for example, auxiliary power units (APU) (not shown) which also produce electrical power. As is well known in the art, the electrical power generated by aerial vehicles typically has certain power characteristics some of which are described in military standard-704F (MIL-STD-704F), which is a United States Military Standard that defines, inter alia, a standardized power interface between a military aircraft and its equipment for both AC and direct current (DC) systems. Some exemplary power types of the electrical power produced by aerial vehicles include, but are not limited to, single phase, 400 hertz (Hz), 115 Volt (AC); three phase, 400 Hz, 115 Volt (AC); single phase, variable frequency, 115 Volt (AC); three phase, variable frequency, 115 Volt (AC), single phase, 60 Hz, 115 Volt (AC); 28 Volt (DC), and 270 Volt (DC) each of which is further described in military standard-704-1 (MIL-STD-704-1) through military standard-704-8 (MIL-HDBK-704-8). Although the self-contained electrical power source 40 has been described as being a generator 44 operably coupled to an engine 46 to produce electrical power, as well electrical power produced by an APU, it is to be entirely understood that any other suitable electrical power sources 40 may be utilized to produce any suitable electrical power having any suitable power characteristics.

As shown in FIG. 2, the aerial vehicle 38 carries the system 10 and the system 10 distributes electrical power to the plurality of loads 42 of the aerial vehicle 38. The plurality of loads 42 is defined as any aerial system, subsystem, component, or device that utilizes electrical power, which is also denoted as 42. Some exemplary aerial systems 42 include, but are not limited to, de-icing systems, camera systems, fuel systems, electrical heating and/or cooling systems, lighting systems, and electrical systems which provide power to electronic devices.

With continued reference to FIG. 1 and FIG. 2, the controller 12 of the system 10 includes at least one non-transitory computer readable storage medium having instructions encoded thereon that, when executed by at least one processor, implements operations to provide power having various power characteristics to the plurality of aerial systems 42 as more fully described below. In one particular embodiment, the controller 12 includes the power load logic 26, the hold-up logic 28, the conditioning logic 30, and the power distribution logic 32 in order to supply and distribute the electrical power to the aerial systems 42. In one example, the controller 12 generates distribution commands to control distribution of the conditioned electrical power from the modular supply and distribution system 10 to each of the plurality of vehicle subsystems 42 as more fully described below.

With continued reference to FIG. 1 and FIG. 2, the at least one modular input port 14 of the system 10 is configured to receive input power produced by the electrical power source 40 of the aerial vehicle 38. For example, and not meant as a limitation, the at least one modular input port 14 may receive three phase, 400 Hz, 115 Volt (AC) input power generated by the generator 44 and the engine 46; however, the at least one modular input port 14 may be configured to receive any suitable input power.

The aerial systems 42 of the aerial vehicle 38 typically have different power requirements. For example, and not meant as a limitation, some aerial systems 42 are powered by AC having certain power characteristics and some aerial systems are powered by DC having certain power characteristics. For example, and not meant as a limitation, a de-icing system may utilize less power than a main camera system or a lighting system. As such, the input power generated by the generator 44 and the engine 46 is conditioned to provide suitable electrical power to various aerial systems 42. Further, the input power may be conditioned to comply with various military standards, including, but not limited to military standards contained within MIL-STD-704F or the like. The power conditioning circuitry 16 conditions the input power to output electrical power that is rectified and filtered to have certain power characteristics. The power conditioning circuitry 16 may include input transformers (not shown), output transformers (not shown), filters (not shown), rectifiers (not shown), and any other components necessary to provide conditioned power having particular power characteristics.

The controller 12 controls the plurality of switching mechanisms 17 to distribute the conditioned electrical power to the various aerial systems 42. In one particular embodiment, the plurality of switching mechanisms 17 may be field effect transistors (FETs) which are electronic devices having a gate terminal, a source terminal, and a drain terminal. The FETs use an electric field to control the flow of current. This is accomplished via application of a voltage to the gate terminal, which in turn alters the conductivity between the drain and source terminals. As such, the controller 12 controls the plurality of switching mechanisms 17 to route the conditioned electrical power to the various aerial systems 42. Although the plurality of switching mechanisms 17 has been described as being FETs, the plurality of switching mechanisms 17 may be any suitable switching mechanisms, such as, for example, an array of relays (not shown).

As stated above, interruptions in the electrical power supplied to aircraft systems may cause some aircraft systems to become inoperable during the power interruption which could have negative effects on, inter alia, the operation of the aircraft. Therefore, some aircraft systems are required to continue to operate during those interruptions. Aircraft systems typically continue to operate during interruptions by utilizing stored electrical power within each individual power supply module of the aircraft systems during the time of the power interruption. The individual power supply modules typically store a sufficient amount of electrical power in order to keep the aircraft system operational during the interruption. As such, aircraft systems typically have a hold-up requirement, which is defined as the amount of power necessary to keep the aircraft system operational for a specific period of time, where the specific period of time is associated with the time periods of power interruptions. For example, and not meant as a limitation, a particular aircraft system may have a fifty millisecond hold-up requirement, which means the aircraft system would need enough stored electrical power for the aircraft system to remain operational during a fifty millisecond power interruption.

In contrast to each aircraft system having its own stored electrical power within their individual power supply modules, the system 10 includes at least one hold-up mechanism 18, such as, for example, a circuit including a capacitor, configured to store at least enough electrical power to satisfy the hold-up requirements of each aerial system 42 that has a hold-up requirement. Therefore, one benefit of the present disclosure is that the hold-up requirements of each aerial system 42 having a hold-up requirement are consolidated within the system 10 which obviates the need for each individual aircraft system to have to store its own electrical power based on its hold-up requirements. Although the at least one hold-up mechanism 18 has been described as being a circuit having a capacitor, the at least one hold-up mechanism 18 may be any suitable hold-up mechanism such as a battery or super capacitor.

The plurality of detectors 19 are in operable communication with the controller 12. Each of the aerial systems 42 having a hold-up requirement is operably engaged with one of the plurality of detectors 19. The plurality of detectors 19 are configured to detect interruptions in electrical power being received by the aerial systems 42. If one of the plurality of detectors 19 detects that electrical power being supplied to the aerial system 42 associated with that detector 19 is interrupted, the detector 19 notifies the controller 12 and the controller 12 distributes conditioned electrical power from the at least one hold-up mechanism 18 to the aerial system 42 during the period of power interruption, and, once the detector 19 indicates that electrical power has been restored, the controller 12 ceases distribution of the electrical power from the at least one hold-up mechanism 18 and distributes conditioned electrical power based on the power load requirement of the aerial system 42.

The plurality of modular outputs 20 of the system 10 is connected to the aerial systems 42. Specifically, one modular output 20 is connected to a particular aerial system 42. Since the various aerial systems 42 are connected to the system 10 via individual modular outputs 20, the system 10 can provide electrical power having different power characteristics to various aerial systems 42 based on the requirements of each aerial system 42 as more fully described below.

The at least one distribution mechanism 22 is a power distribution bus configured to distribute electrical power from the controller 12, which includes conditioned electrical power based on power load requirements and hold-up requirements, to the aerial systems 42 as required and as more fully described below. The at least one distribution mechanism 22 connects the plurality of modular outputs 20 to the aerial systems 42 which allows the system 10 to deliver electrical power to the aerial systems 42. Although the at least one distribution mechanism 22 has been described as being a power distribution bus, the at least one distribution mechanism 22 may be any suitable distribution mechanism.

The data communication network 24 directly connects the system 10 to the aerial systems 42 such as, for example, by an Ethernet connection or any other suitable wired connection. However, it is equally possible for the data communication network 24 to wirelessly connect the system 10 to the aerial systems 42 such as, for example, by a suitable wireless connection. Stated otherwise, the data communication network 24 electrically connects the system 10 to the aerial systems 42 and may be any wireless or wired connection to effectuate the transfer of digital information or data between the system 10 and the aerial systems 42. The controller 12 is configured to or is operative to generate a signal in response to the data transferred between the system 10 and the aerial systems 42. In some implementations, the data that is sent over the data communication network 24 are power load requirements and hold-up requirements of the aerial systems 42. As will be described in greater detail below, the controller 12 includes various logics, such as, for example, the power load logic 26, the hold-up logic 28, the conditioning logic 30, and the power distribution logic 32 which performs functions described in greater detail below.

The initialization module 11 of the system 10 includes at least one non-transitory computer readable storage medium having instructions encoded thereon that, when executed by at least one processor, implements operations to initialize the system 10 when the initialization module is electrically connected to the vehicle 38. It should be noted that this storage medium and processor could be the same storage medium and processor utilized by the controller 12 and various logics 26, 28, 30, and 32. The initialization module 11 is a dongle, which is defined as an electronic copy protection and content protection device which, when attached to a computer or other electronic system, unlocks software functionality or decodes content; however, the initialization module 11 may be any suitable initialization module. One advantage of utilizing a dongle is that it provides an operator of the system 10 the ability to quickly upload power instructions/requirements or quickly replace previous power instructions/requirements. Although a particular initialization method has been described herein, the system 10 may be initialized on the aerial vehicle 38 in any suitable manner.

The system 10 may be implemented in a system on a chip (SoC), which is an integrated circuit or chip that integrates all components of an electronic system. Typical components include a central processing unit (CPU), a memory, input/output ports and secondary storage, each of which are provided on a single substrate. The SoC may contain digital, analog, mixed-signal, and often radio frequency signal processing functions, depending on the application. One benefit of integrating all of the components on a single electronic substrate is that SoCs consume less power and take up less area than multi-chip designs with equivalent functionality. When the system 10 is implemented in an SoC, at least the following components may be provided on an integrated circuit or chip having a single substrate: the controller 12, the power conditioning circuitry 16, the plurality of switching mechanisms 17, the at least one hold-up mechanism 18, the power load logic 26, the hold-up logic 28, the conditioning logic 30, and the power distribution logic 32. Although a particular implementation of the system 10 has been described, the system 10 may be implemented in any suitable manner.

Having thus described the exemplary structural configuration of some aspects of the system 10, reference will now be made to the operation in which the system 10 uses the controller 12, the at least one modular input port 14, the power conditioning circuitry 16, the plurality of switching mechanisms 17, the at least one hold-up mechanism 18, the plurality of detectors 19, the plurality of modular output ports 20, the at least one distribution mechanism 22, the data communication network 24, and the various logics, such as, for example, the power load logic 26, the hold-up logic 28, the conditioning logic 30, and the power distribution logic 32.

The power load logic 26 includes at least one non-transitory computer readable storage medium having instructions encoded thereon that, when executed by at least one processor, implements operations to determine a power load requirement of each of the aerial systems 42. Each vehicle system 42 includes a power load requirement, which is defined as a required voltage and current draw of the particular load or a wattage requirement of the particular load. The power load requirements of the aerial systems 42 are provided by the aerial systems 42 to the system 10 via the data communication network 24. Specifically, each of the aerial systems 42 requests power from the system 10 based, at least in part, on its own power load requirement through the data communication network 24. For example, and not meant as a limitation, a de-icing system may need a certain voltage and current draw to operate and that certain voltage and current draw may be communicated to the controller 12 via a signal that travels through the data communication network 24. Although a particular manner of determining the power load requirement of each aerial system 42 has been described, the power load requirement of each of the aerial systems 42 may be determined in any suitable manner.

The hold-up logic 28 includes at least one non-transitory computer readable storage medium having instructions encoded thereon that, when executed by at least one processor, implements operations to determine a hold-up requirement of each of the aerial systems 42 that has a hold-up requirement. The hold-up requirement of each aerial system 42 is provided to the system 10 by each of the aerial systems 42 via the data communication network 24. Specifically, each of the aerial systems 42 requests a hold-up requirement from the system 10 based, at least in part, on its own hold-up requirement through the data communication network 24. For example, and not meant as a limitation, a camera system may have a certain hold-up requirement to operate during power interruptions and that certain hold-up requirement may be communicated to the controller 12 via a signal that travels through the data communication network 24. Although a particular manner of determining the hold-up requirement of each aerial system 42 having a hold-up requirement has been described, the hold-up requirement of each of the aerial systems 42 may be determined in any suitable manner.

The conditioning logic 30 includes at least one non-transitory computer readable storage medium having instructions encoded thereon that, when executed by at least one processor, implements operations to condition the electrical power received by the power conditioning circuitry 16. The conditioning logic 30 may, inter alia, filter and rectify the electrical power to translate the electrical power into electrical power having any suitable power characteristics. The power characteristics are based, at least in part, on the power load requirements of the aerial systems 42 and the hold-up requirements of each aerial system 42 having a hold-up requirement. The power conditioning circuitry 16 may utilize any suitable components to condition the electrical power to provide electrical power having any suitable power characteristics.

The power distribution logic 32 includes at least one non-transitory computer readable storage medium having instructions encoded thereon that, when executed by at least one processor, implements operations to distribute the conditioned electrical power to the aerial systems 42 based, at least in part, on the power load requirements of the aerial systems 42 via one of the plurality of switching mechanisms 17. The power distribution logic 32 also distributes the conditioned electrical power to the at least one hold-up mechanism 18, and, if necessary, from the at least one hold-up mechanism 18 to the aerial systems 42 having a hold-up requirement in the event of a power interruption via one of the plurality of switching mechanism 17 and as more fully described below. For example, and not meant as a limitation, a camera system may have a certain power load requirement and a certain hold-up requirement. The controller 12 controls one of the plurality of switching mechanisms 17 and the power distribution logic 32 to distribute the conditioned electrical power based on the power load requirement to the camera system, as necessary. In the event of a power interruption, the detector 19 associated with the camera system detects the power interruption and communicates the power interruption to the controller 12. The controller 12 controls one of the plurality of switching mechanisms 17 and the power distribution logic 32 to distribute the conditioned electrical power based on the hold-up requirement to the camera system as necessary, such as, for example, for the time period specified by the hold-up requirement or until the detector 19 detects that power has been restored and communicates the restoration of power to the controller 12.

Further, the conditioned electrical power may be distributed to multiple aerial systems 42 simultaneously or at different times. For example, and not meant as a limitation, the controller 12 controls one of the plurality of switching mechanisms 17 and the power distribution logic 32 to distribute conditioned electrical power to a first aerial system 42a during a first time period based on a first power load requirement and the conditioned electrical power may be switched or routed away from the first aerial system 42a via the controller 12 and one of the plurality of switching mechanisms 17, reconditioned to a second power load requirement, and the controller 12 controls one of the plurality of switching mechanisms 17 and the power distribution logic 32 to distribute the conditioned electrical power to a second aerial system 42b during a second time period. In one particular embodiment, the switching of the electrical power from one aerial system 42 to another aerial system 42 is accomplished via FETs; however, the switching of the electrical power from one aerial system 42 to another aerial system 42 may be accomplished in any suitable manner.

For example, and not meant as a limitation, if the first aerial system 42a is a de-icing system, and the second aerial system 42b is a radar amplifier, and the electrical power is conditioned according to the power load requirement of the de-icing system and the controller 12 controls one of the plurality of switching mechanisms 17 and the power distribution logic 32 to distribute the conditioned electrical power to the de-icing system during a first time period, the system 10 may stop providing the conditioned electrical power to the de-icing system, recondition the electrical power according to the power load requirement of the radar amplifier, and the controller 12 controls one of the plurality of switching mechanisms 17 and the power distribution logic 32 to distribute the reconditioned electrical power to the radar amplifier. This is beneficial compared to conventional power supply modules where the de-icing system and the radar amplifier would each have their own individual power supply modules which would simultaneously require an electrical power supply to operate the de-icing system and the radar amplifier.

According to one embodiment, a priority level is established by the power load logic 26 for the redistribution of certain power to certain aerial systems 42. Continuing the above example, a low priority level for the de-icing system allows the power distribution logic 32 to reprioritize and redirect power to the radar amplifier for a certain time period. According to a further example, sensors or user interaction can be used to readjust the priority level. If a sensor determines that de-icing is required, the priority level can be adjusted higher and the power distribution logic 32 reacts accordingly. Likewise, a user may adjust or override the priority levels and redirect power.

An exemplary operation of the system 10 will now be provided where the system 10 supplies and distributes electrical power to a camera system of the aerial vehicle 38. The camera system has a power load requirement and a hold-up requirement. The power load requirement and the hold-up requirement are transmitted via the data communication network 24 to the controller 12 of the system. The system 10 receives electrical power from the electrical power source 40. The power conditioning circuitry 16 conditions the electrical power based, at least in part on the power load requirement and the hold-up requirement of the camera system. The controller 12 controls one of the plurality of switching mechanisms 17 and the power distribution logic 32 to distribute the conditioned electrical power based on the power load requirement to the camera system via the at least one distribution mechanism 22 and the conditioned electrical power is utilized by the camera system to operate. The conditioned electrical power based on the hold-up requirement is distributed to the at least one hold-up mechanism 18 via the power conditioning circuitry 16 and the conditioned electrical power is stored within the at least one hold-up mechanism 18. In the event of an electrical power interruption, which is detected by the detector 19 and communicated to the controller 12, the controller 12 controls one of the plurality of switching mechanisms 17 and the power distribution logic 32 to distribute the conditioned electrical power based on the hold-up requirement to distribute the conditioned electrical power stored within the at least one hold-up mechanism 18 to the camera system and the conditioned electrical power is utilized by the camera system to operate for the time period specified by the hold-up requirement or until the detector 19 detects that power has been restored and communicates the restoration of power to the controller 12. Although an exemplary operation of the system 10 has been described, the system 10 may be utilized in any suitable manner to supply and distribute electrical power to any suitable aerial system 42.

Figure 3:
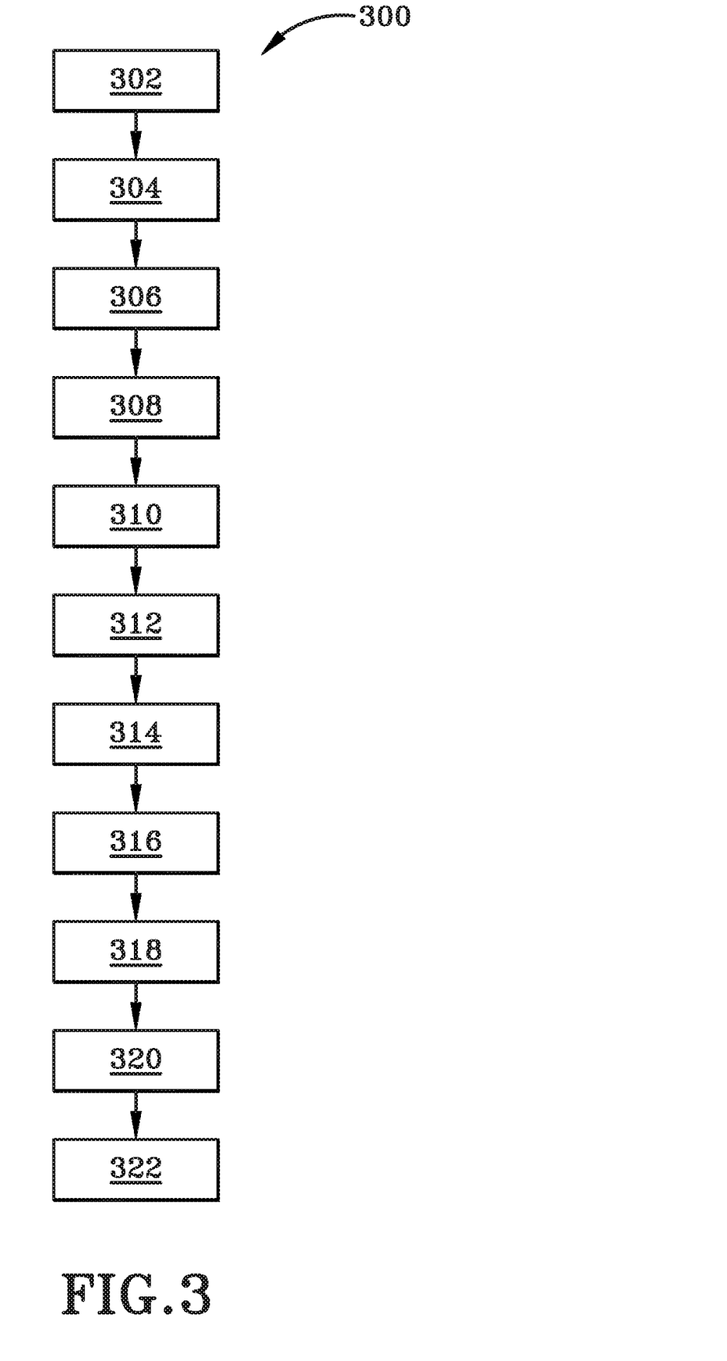
FIG. 3 is a flow chart representing an exemplary method or process in accordance with the present disclosure.

FIG. 3 depicts a method in accordance with one aspect of the present disclosure generally at 300. The method 300 includes receiving, with a central modular supply and distribution system 10, electrical power from a power source 40 on a vehicle 38; wherein the central modular supply and distribution system 10 provides power to a plurality of vehicle subsystems 42; and wherein the central modular supply and distribution system 10 is remote from the plurality of vehicle subsystems 42, which is shown generally at 302; determining, with power load logic 26 in the central modular supply and distribution system 10 and not within the plurality of vehicle subsystems 42, a power load requirement of the plurality of vehicle subsystems 42, which is shown generally at 304; conditioning, with power conditioning circuitry 16 in the central modular supply and distribution system 10, the electrical power based, at least in part, on the power load requirement of each of the plurality of vehicle subsystems 42, which is shown generally at 306; generating, with a controller 12 in the central modular supply and distribution system 10, distribution commands to control distribution of the conditioned electrical power from the modular supply and distribution system 10 to each of the plurality of vehicle subsystems 42, which is shown generally at 308; and dynamically distributing, with at least one power distribution bus 22, the conditioned electrical power from the modular supply and distribution system 10 to each of the plurality of vehicle subsystems 42 based, at least in part, on the distribution commands, which is shown generally at 310. The method further includes communicating the power load requirement of each of the plurality of vehicle systems 42 to the modular supply and distribution system 10 via a data communication network 24, which is shown generally at 312. The method further includes distributing the conditioned electrical power to two or more of the plurality of vehicle subsystems 42 simultaneously, which is shown generally at 314. The method further includes distributing the conditioned electrical power to two or more of the plurality of vehicle subsystems 42 at different times, which is shown generally at 316. The method further includes determining, with hold-up logic 28 in the central modular supply and distribution system 10 and not within the plurality of vehicle subsystems 42, a hold-up requirement of at least one of the plurality of vehicle subsystems 42, which is shown generally at 318; conditioning, with the power conditioning circuitry 16, the electrical power based, at least in part, on the hold-up requirement of the at least one of the plurality of vehicle subsystems 42, which is shown generally at 320; storing the conditioned electrical power in at least one hold-up mechanism 18 provided in the central modular supply and distribution system 10, which is shown generally at 322; determining, with the controller 12, that an electrical power interruption to the at least one of the plurality of vehicle subsystems 42 has occurred, which is shown generally at 324; and dynamically distributing, with the at least one power distribution bus 22, the stored conditioned electrical power from the at least one hold-up mechanism 18 to the at least one of the plurality of vehicle subsystems 42 during the power interruption or until power has been restored, which is shown generally at 326.

According to another aspect, the modular power supply and distribution system 10 may allow evaluation and utilization of legacy systems in the implementation of the processes discussed herein. Specifically, the modular power supply and distribution system 10 assets may be legacy assets which may be retrofitted with software or other instructions to accomplish the features of the present disclosure without significantly increasing size, weight, power, or cost to existing legacy threat warning systems. Processes described herein may be uploaded to existing legacy assets, or may be added thereto through the use of an additional memory module, including an additional non-transitory storage medium, or through the use of temporary memory devices, such as flash memory or the like. Accordingly, the modular power supply and distribution system 10 may allow these existing legacy assets to be optimized and used without adjustments thereto.

It is to be understood that the various logics, such as the power load logic 26, the hold-up logic 28, the conditioning logic 30, and the power distribution logic 32 may utilize any suitable number of non-transitory computer readable storage mediums and any suitable number of processors. For example, and not meant as a limitation, the various logics can be stored on one non-transitory computer readable storage medium or multiple computer readable storage mediums and the various logics can be processed by any suitable number of processors.

Various inventive concepts may be embodied as one or more methods, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

While various inventive embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the inventive embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the inventive teachings is/are used. Those skilled in the art will recognize, or be able to ascertain using no more than routine experimentation, many equivalents to the specific inventive embodiments described herein. It is, therefore, to be understood that the foregoing embodiments are presented by way of example only and that, within the scope of the appended claims and equivalents thereto, inventive embodiments may be practiced otherwise than as specifically described and claimed. Inventive embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the inventive scope of the present disclosure.

The above-described embodiments can be implemented in any of numerous ways. For example, embodiments of technology disclosed herein may be implemented using hardware, software, or a combination thereof. When implemented in software, the software code or instructions can be executed on any suitable processor or collection of processors, whether provided in a single computer or distributed among multiple computers. Furthermore, the instructions or software code can be stored in at least one non-transitory computer readable storage medium.

Also, a computer or smartphone utilized to execute the software code or instructions via its processors may have one or more input and output devices. These devices can be used, among other things, to present a user interface. Examples of output devices that can be used to provide a user interface include printers or display screens for visual presentation of output and speakers or other sound generating devices for audible presentation of output. Examples of input devices that can be used for a user interface include keyboards, and pointing devices, such as mice, touch pads, and digitizing tablets. As another example, a computer may receive input information through speech recognition or in other audible format.

Such computers or smartphones may be interconnected by one or more networks in any suitable form, including a local area network or a wide area network, such as an enterprise network, and intelligent network (IN) or the Internet. Such networks may be based on any suitable technology and may operate according to any suitable protocol and may include wireless networks, wired networks or fiber optic networks.

The various methods or processes outlined herein may be coded as software/instructions that is executable on one or more processors that employ any one of a variety of operating systems or platforms. Additionally, such software may be written using any of a number of suitable programming languages and/or programming or scripting tools, and also may be compiled as executable machine language code or intermediate code that is executed on a framework or virtual machine.

In this respect, various inventive concepts may be embodied as a computer readable storage medium (or multiple computer readable storage media) (e.g., a computer memory, one or more floppy discs, compact discs, optical discs, magnetic tapes, flash memories, USB flash drives, SD cards, circuit configurations in Field Programmable Gate Arrays or other semiconductor devices, or other non-transitory medium or tangible computer storage medium) encoded with one or more programs that, when executed on one or more computers or other processors, perform methods that implement the various embodiments of the disclosure discussed above. The computer readable medium or media can be transportable, such that the program or programs stored thereon can be loaded onto one or more different computers or other processors to implement various aspects of the present disclosure as discussed above.

The terms "program" or "software" or "instructions" are used herein in a generic sense to refer to any type of computer code or set of computer-executable instructions that can be employed to program a computer or other processor to implement various aspects of embodiments as discussed above. Additionally, it should be appreciated that according to one aspect, one or more computer programs that when executed perform methods of the present disclosure need not reside on a single computer or processor, but may be distributed in a modular fashion amongst a number of different computers or processors to implement various aspects of the present disclosure.

Computer-executable instructions may be in many forms, such as program modules, executed by one or more computers or other devices. Generally, program modules include routines, programs, objects, components, data structures, etc. that perform particular tasks or implement particular abstract data types. Typically the functionality of the program modules may be combined or distributed as desired in various embodiments.

Also, data structures may be stored in computer-readable media in any suitable form. For simplicity of illustration, data structures may be shown to have fields that are related through location in the data structure. Such relationships may likewise be achieved by assigning storage for the fields with locations in a computer-readable medium that convey relationship between the fields. However, any suitable mechanism may be used to establish a relationship between information in fields of a data structure, including through the use of pointers, tags or other mechanisms that establish relationship between data elements.

All definitions, as defined and used herein, should be understood to control over dictionary definitions, definitions in documents incorporated by reference, and/or ordinary meanings of the defined terms.

"Logic", as used herein, includes but is not limited to hardware, firmware, software and/or combinations of each to perform a function(s) or an action(s), and/or to cause a function or action from another logic, method, and/or system. For example, based on a desired application or needs, logic may include a software controlled microprocessor, discrete logic like a processor (e.g., microprocessor), an application specific integrated circuit (ASIC), a programmed logic device, a memory device containing instructions, an electric device having a memory, or the like. Logic may include one or more gates, combinations of gates, or other circuit components. Logic may also be fully embodied as software. Where multiple logics are described, it may be possible to incorporate the multiple logics into one physical logic. Similarly, where a single logic is described, it may be possible to distribute that single logic between multiple physical logics.

Furthermore, the logic(s) presented herein for accomplishing various methods of this system may be directed towards improvements in existing computer-centric or internet-centric technology that may not have previous analog versions. The logic(s) may provide specific functionality directly related to structure that addresses and resolves some problems identified herein. The logic(s) may also provide significantly more advantages to solve these problems by providing an exemplary inventive concept as specific logic structure and concordant functionality of the method and system. Furthermore, the logic(s) may also provide specific computer implemented rules that improve on existing technological processes. The logic(s) provided herein extends beyond merely gathering data, analyzing the information, and displaying the results. Further, portions or all of the present disclosure may rely on underlying equations that are derived from the specific arrangement of the equipment or components as recited herein. Thus, portions of the present disclosure as it relates to the specific arrangement of the components are not directed to abstract ideas. Furthermore, the present disclosure and the appended claims present teachings that involve more than performance of well-understood, routine, and conventional activities previously known to the industry. In some of the method or process of the present disclosure, which may incorporate some aspects of natural phenomenon, the process or method steps are additional features that are new and useful.

The indefinite articles "a" and "an," as used herein in the specification and in the claims, unless clearly indicated to the contrary, should be understood to mean "at least one." The phrase "and/or," as used herein in the specification and in the claims (if at all), should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc. As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of." "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures.

An embodiment is an implementation or example of the present disclosure. Reference in the specification to "an embodiment," "one embodiment," "some embodiments," "one particular embodiment," "an exemplary embodiment," or "other embodiments," or the like, means that a particular feature, structure, or characteristic described in connection with the embodiments is included in at least some embodiments, but not necessarily all embodiments, of the invention. The various appearances "an embodiment," "one embodiment," "some embodiments," "one particular embodiment," "an exemplary embodiment," or "other embodiments," or the like, are not necessarily all referring to the same embodiments.

If this specification states a component, feature, structure, or characteristic "may", "might", or "could" be included, that particular component, feature, structure, or characteristic is not required to be included. If the specification or claim refers to "a" or "an" element, that does not mean there is only one of the element. If the specification or claims refer to "an additional" element, that does not preclude there being more than one of the additional element.

Additionally, the method of performing the present disclosure may occur in a sequence different than those described herein. Accordingly, no sequence of the method should be read as a limitation unless explicitly stated. It is recognizable that performing some of the steps of the method in an different order could achieve a similar result.

In the foregoing description, certain terms have been used for brevity, clearness, and understanding. No unnecessary limitations are to be implied therefrom beyond the requirement of the prior art because such terms are used for descriptive purposes and are intended to be broadly construed.

Moreover, the description and illustration of various embodiments of the disclosure are examples and the disclosure is not limited to the exact details shown or described.

The invention claimed is:

1. A modular power supply and distribution system for a vehicle comprising:
   a controller;
   at least one power distribution bus operably connected to the controller; wherein the system receives electrical power from an electrical power source and distributes the electrical power to the at least one power distribution bus; wherein the at least one power distribution bus distributes the electrical power to a plurality of loads;
   a data communication network configured to communicate data between the system and the plurality of loads;
   the controller, comprising:
      power load logic for determining a power load requirement of each of the plurality of loads;
      hold-up logic for determining a hold-up requirement of at least one of the plurality of loads;
      power conditioning circuitry for conditioning the electrical power; wherein the conditioned electrical power has power characteristics, based, at least in part, on the power load requirements of each of the plurality of loads and the hold-up requirement of the at least one of the plurality of loads;

at least one hold-up mechanism for storing the conditioned electrical power to satisfy the hold-up requirements of each of the plurality of loads that has a hold-up requirement; and power distribution logic for distributing the electrical power to the plurality of loads based, at least in part, on the determined power load requirement of each of the plurality of loads and the hold-up requirement of the at least one of the plurality of loads, and dynamically distributing, with the at least one power distribution bus, the stored conditioned electrical power from the at least one hold-up mechanism to the at least one of the plurality of vehicle subsystems during a power interruption.

2. The modular power supply and distribution system of claim 1, wherein the power load requirement for each of the plurality of loads is communicated from each of the plurality of loads to the system through the data communication network; and wherein the hold-up requirement of the at least one of the plurality of loads is communicated from the at least one of the plurality of loads to the system through the data communication network.

3. The modular power supply and distribution system of claim 1, wherein at least one of the power load requirements is different than another of the power load requirements.

4. The modular power supply and distribution system of claim 1, wherein the hold-up requirement of at least one of the plurality of loads includes a first hold-up requirement for a first load and a second hold-up requirement for a second load; wherein the first hold-up requirement is different than the second hold-up requirement.

5. The modular supply and distribution system of claim 1, wherein the power load requirement comprises:
 a voltage requirement of each of the plurality of loads; and
 a current requirement of each of the plurality of loads.

6. The modular supply and distribution system of claim 1, wherein the hold-up requirement comprises:
 a voltage requirement of the at least one of the plurality of loads;
 a current requirement of the at least one of the plurality of loads; and
 a time period of operation.

7. The modular power supply and distribution system of claim 1, wherein the electrical power source is a single power source.

8. The modular power supply and distribution system of claim 1, wherein the system is implemented on a system on a chip (SoC).

9. The modular power supply and distribution system of claim 1, further comprising:
 a plurality of modular outputs; wherein each of the plurality of loads is connected to one of the plurality of modular outputs.

10. The modular power supply and distribution system of claim 1, wherein the power distribution logic causes the at least one power distribution bus to distribute the conditioned electrical power to two or more of the plurality of loads simultaneously.

11. The modular supply and distribution system of claim 1, wherein the power distribution logic causes the at least one power distribution bus to distribute the conditioned electrical power to two or more of the plurality of loads at different times.

12. The modular supply and distribution system of claim 1, further comprising providing a priority level to at least some of the plurality of loads by power load logic.

13. The modular supply and distribution system of claim 1, wherein the vehicle is an aerial vehicle.

14. The modular supply and distribution system of claim 1, further comprising:
 an initialization module; wherein the system is initialized when the initialization module is electrically connected to the vehicle.

15. The modular supply and distribution system of claim 14, wherein the initialization module is a dongle.

16. A method comprising:
 receiving, with a central modular supply and distribution system, electrical power from a power source on a vehicle; wherein the central modular supply and distribution system provides power to a plurality of vehicle subsystems; wherein the central modular supply and distribution system is remote from the plurality of vehicle subsystems;
 determining, with power load logic in the central modular supply and distribution system and not within the plurality of vehicle subsystems, a power load requirement of the plurality of vehicle subsystems;
 determining, with hold-up logic in the central modular supply and distribution system and not within the plurality of vehicle subsystems, a hold-up requirement of at least one of the plurality of vehicle subsystems;
 conditioning, with power conditioning circuitry in the central modular supply and distribution system, the electrical power based, at least in part, on the power load requirement of each of the plurality of vehicle subsystems and the hold-up requirement of the at least one of the plurality of vehicle subsystems;
 generating, with a controller in the central modular supply and distribution system, distribution commands to control distribution of the conditioned electrical power based on the power load requirement of each of the plurality of vehicle subsystems and the hold-up requirement of the at least one of the plurality of vehicle subsystems;
 dynamically distributing, with at least one power distribution bus, the conditioned electrical power from the modular supply and distribution system to the plurality of vehicle subsystems based, at least in part, on the distribution commands;
 storing the conditioned electrical power in at least one hold-up mechanism provided in the central modular supply and distribution system;
 determining, with the controller, that an electrical power interruption to the at least one of the plurality of vehicle subsystems has occurred; and
 dynamically distributing, with the at least one power distribution bus, the stored conditioned electrical power from the at least one hold-up mechanism to the at least one of the plurality of vehicle subsystems during the power interruption.

17. The method of claim 16, further comprising:
 communicating the power load requirement of each of the plurality of vehicle subsystems to the central modular supply and distribution system via a data communication network; and
 communicating the hold-up requirement of the at least one of the plurality of vehicle subsystems to the central modular supply and distribution system via the data communication network.

18. The method of claim 16, further comprising:
distributing the conditioned electrical power to two or more of the plurality of vehicle subsystems simultaneously.

19. The method of claim 16, further comprising:
distributing the conditioned electrical power to two or more of the plurality of vehicle subsystems at different times.

20. The modular supply and distribution system of claim 1, wherein the at least one hold-up mechanism is a single hold-up-mechanism.

* * * * *